United States Patent
Taniguchi et al.

(10) Patent No.: US 11,955,919 B2
(45) Date of Patent: Apr. 9, 2024

(54) ELECTRIC MOTOR SYSTEM

(71) Applicant: DENSO CORPORATION, Kariya (JP)

(72) Inventors: Makoto Taniguchi, Kariya (JP); Kazunari Moriya, Nagakute (JP); Kenji Hiramoto, Nagakute (JP); Hideo Nakai, Nagakute (JP); Yuuko Ohtani, Nagakute (JP); Shinya Urata, Nagakute (JP); Masafumi Namba, Nagakute (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 17/352,630

(22) Filed: Jun. 21, 2021

(65) Prior Publication Data

US 2021/0313912 A1    Oct. 7, 2021

Related U.S. Application Data

(63) Continuation of application No. PCT/JP2019/047477, filed on Dec. 4, 2019.

(30) Foreign Application Priority Data

Dec. 21, 2018  (JP) .................................. 2018-239201

(51) Int. Cl.
*H02P 6/30*  (2016.01)

(52) U.S. Cl.
CPC ............ *H02P 6/30* (2016.02); *H02P 2207/05* (2013.01)

(58) Field of Classification Search
CPC .. H02P 6/30; H02P 27/06; H02P 21/22; H02P 25/18; H02P 2207/05
See application file for complete search history.

(56) References Cited

U.S. PATENT DOCUMENTS 5,491,622 A * 2/1996 Carosa ..................... H02M 7/48
                                                          363/56.02
8,053,915 B2 * 11/2011 Umeda .................... H02P 27/06
                                                          322/44

(Continued)

FOREIGN PATENT DOCUMENTS

JP    2003-143897 A    5/2003
JP    2008-306914 A    12/2008

(Continued)

OTHER PUBLICATIONS

Mar. 3, 2020 International Search Report issued in International Patent Application No. PCT/JP2019/047477.

*Primary Examiner* — Thai T Dinh
(74) *Attorney, Agent, or Firm* — Oliff PLC

(57) ABSTRACT

An electric motor system includes a battery, an inverter, an electric motor, a zero-phase switching arm and a control unit. The inverter converts DC power output from the battery into three-phase AC power and outputs the three-phase AC power to the electric motor. A rotor of the electric motor rotates by the three-phase AC power output from the inverter. A neural point of the electric motor is connected to the zero-phase switching arm. A zero-phase current flowing through respective windings of the electric motor is adjusted by switching of the zero-phase switching arm. By this means, in the electric motor system, torque is generated at the rotor also using the zero-phase current as well as a three-phase AC current flowing through the respective windings.

3 Claims, 10 Drawing Sheets

(56) References Cited

U.S. PATENT DOCUMENTS

| | | | | |
|---|---|---|---|---|
| 9,843,278 B2 * | 12/2017 | Toba | ............... | H02M 3/1582 |
| 2007/0086226 A1 * | 4/2007 | Mavier | ............ | H02M 7/53875 |
| | | | | 363/132 |
| 2009/0096394 A1 * | 4/2009 | Taniguchi | ............ | H02P 29/032 |
| | | | | 318/400.09 |
| 2009/0206781 A1 * | 8/2009 | Itoh | ............ | H02P 27/04 |
| | | | | 318/400.3 |
| 2012/0286705 A1 * | 11/2012 | Tanaka | ............ | H02P 27/08 |
| | | | | 318/139 |
| 2019/0044110 A1 * | 2/2019 | Sheeks | ............ | H02K 5/15 |

FOREIGN PATENT DOCUMENTS

| | | |
|---|---|---|
| JP | 2015-232299 A | 12/2015 |
| JP | 2016-042768 A | 3/2016 |
| JP | 2016-73097 A | 5/2016 |

\* cited by examiner

ELECTRIC MOTOR SYSTEM

CROSS-REFERENCE TO RELATED APPLICATION

The present application is a continuation application of International Application No. PCT/JP2019/047477, filed Dec. 4, 2019, which claims priority to Japanese Patent Application No. 2018-239201, filed Dec. 21, 2018. The contents of these applications are incorporated herein by reference in their entirety.

BACKGROUND

1. Technical Field

The present disclosure relates to an electric motor system.

2. Related Art

An electric motor which generates torque by electric energy is used in an electric car, or the like. The electric motor generates torque at a rotor, for example, by electromagnetic interaction between a permanent magnet provided at the rotor and a stator coil provided at a stator. Typically, the stator coil of the electric motor is connected to an inverter. The inverter applies a multi-phase AC current, which generates rotating fluxes around the rotor, to multi-phase windings which constitute the stator coil. Torque is generated at the rotor of the electric motor by the generated rotating fluxes.

SUMMARY

The present disclosure provides an electric motor system. As an aspect of the present disclosure, an electric motor system includes a stator core body portion enclosing a rotor, and a plurality of teeth arranged in a circular manner and respectively projecting toward the rotor from a wall surface of the stator core body portion. The present electric motor system further includes a concentrated winding stator coil, an inverter, and a zero-phase switching arm. The concentrated winding stator coil includes plural-phase windings, and the windings are arranged at teeth defined for the respective windings among a plurality of the teeth. The inverter to which respective first ends of the plural-phase windings are connected, applies a current for generating rotating fluxes around the rotor to the plural-phase windings. The zero-phase switching arm, to which respective second ends of the plural-phase windings are commonly connected, adjusts a zero-phase current flowing through a common connection point of the plural-phase windings and generates torque at the rotor using the zero-phase current.

DETAILED DESCRIPTION OF THE PREFERRED EMBODIMENTS

Figure 1:
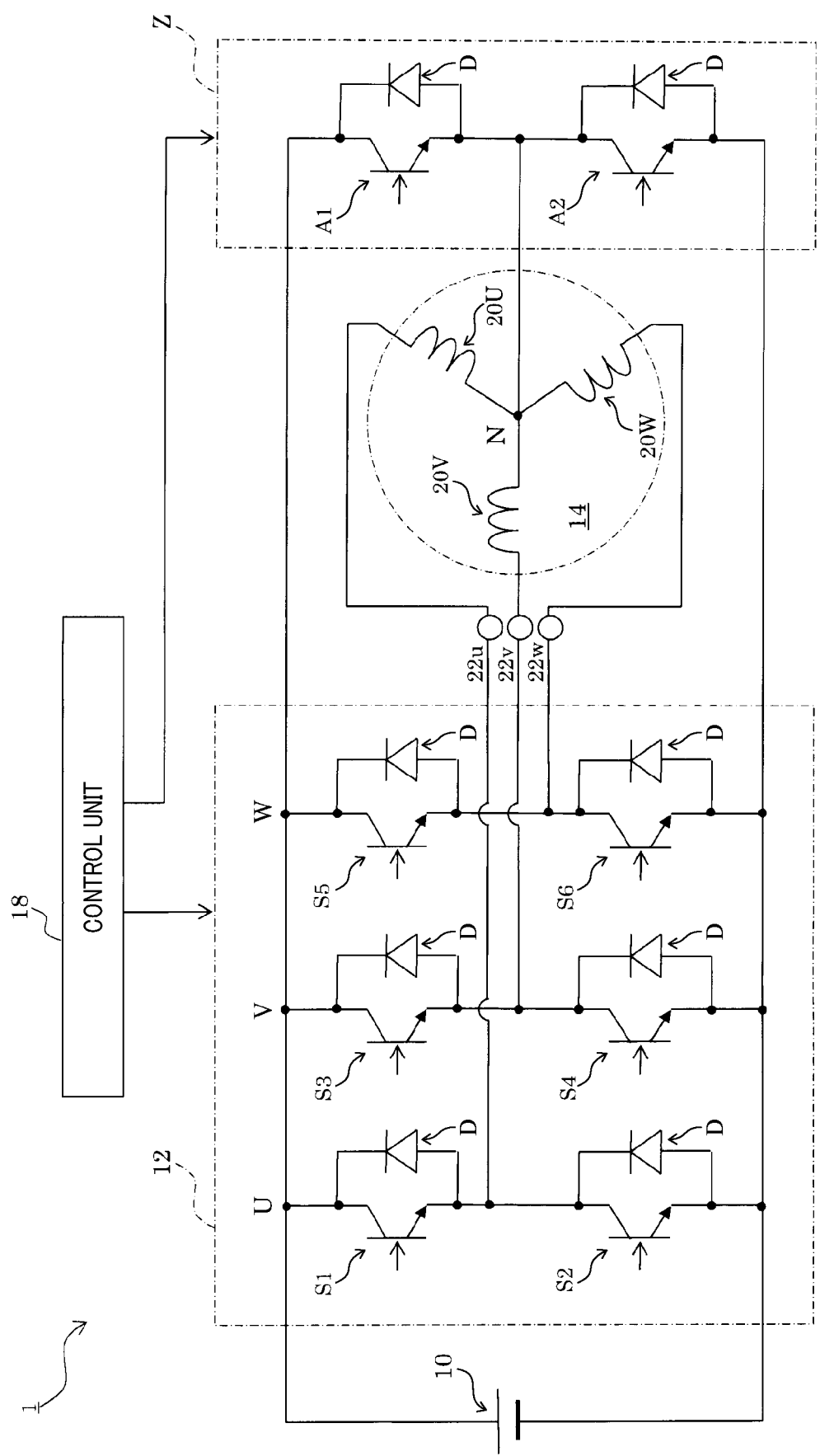
FIG. 1 is a view illustrating a configuration of an electric motor system according to a first embodiment.

JP 2016-42768 A (hereinafter referred to as "PTL 1") discloses a technology of generating force in a radius direction at a rotor by controlling a zero-phase current flowing through multi-phase windings which constitute a stator coil. The zero-phase current is a current which flows through the multi-phase windings constituting the stator coil in the same phase. Further, J P 2008-306914 A (hereinafter referred to as "PTL 2") discloses a control apparatus of rotating electrical machine in which a battery is connected to a neutral point of multi-phase windings which constitute a stator coil. With the technology disclosed in PTL 2, a zero-phase current flowing through the multi-phase windings is switched by an inverter, and an output voltage of the battery is boosted by induced electromotive force generated at the multi-phase windings. Further, a capacitor as a DC voltage source included in the inverter is charged by the boosted voltage.

To increase torque generated at a rotor of an electric motor, multi-phase AC power to be input to the electric motor may be increased. However, it is difficult to input sufficient multi-phase AC power to the electric motor depending on a DC voltage to be input to an inverter or a utilization rate of the DC voltage. Thus, there is a case where necessary torque cannot be obtained. PTL 1 and PTL 2 disclose a technology of utilizing a zero-phase current in addition to the multi-phase AC current flowing through a stator coil. However, the zero-phase current disclosed in these literatures is not utilized for increasing torque generated at the rotor.

The present disclosure is directed to increasing torque generated at a rotor of an electric motor.

A first electric motor system which is one aspect of the present disclosure includes a stator core body portion enclosing a rotor, and a plurality of teeth arranged in a circular manner and respectively projecting toward the rotor from a wall surface of the stator core body portion. The present electric motor system further includes a concentrated winding stator coil, an inverter, and a zero-phase switching arm. The concentrated winding stator coil includes plural-phase windings, and the windings are arranged at teeth defined for the respective windings among a plurality of the teeth. The inverter to which respective first ends of the plural-phase windings are connected, applies a current for generating rotating fluxes around the rotor to the plural-phase windings. The zero-phase switching arm, to which respective second ends of the plural-phase windings are commonly connected, adjusts a zero-phase current flowing through a common connection point of the plural-phase windings and generates torque at the rotor using the zero-phase current.

Further, a second electric motor system which is one aspect of the present disclosure includes a stator core body portion enclosing a rotor, and a plurality of teeth arranged in a circular manner and respectively projecting toward the rotor from a wall surface of the stator core body portion. The present electric motor system further includes a concentrated winding stator coil and first and second inverters. The concentrated winding stator coil includes plural-phase windings, and the windings are arranged at teeth defined for the respective windings among a plurality of the teeth. The first inverter, to which respective first ends of the plural-phase windings are connected, applies a current for generating rotating fluxes around the rotor to the plural-phase windings. The second inverter, to which respective second ends of the plural-phase windings are connected, applies a current for generating rotating fluxes around the rotor to the plural-phase windings, adjusts a zero-phase current flowing through the plural-phase windings and generates torque at the rotor using the zero-phase current.

Preferably, in the second electric motor system, the respective windings include forward windings and reverse windings which are connected in series. The forward windings and the reverse windings of the respective windings are arranged at teeth defined for the forward windings and the reverse windings of the respective windings among a plurality of the teeth. Serial connection points of the forward windings and the reverse windings at respective plural-phase windings are commonly connected.

Preferably, the second electric motor system includes U-phase, V-phase and W-phase windings as the plural-phase windings. A U-phase forward winding, a V-phase reverse winding and a W-phase forward winding are connected to the first inverter. A U-phase reverse winding, a V-phase forward winding and a W-phase reverse winding are connected to the second inverter.

Preferably, the first electric motor system includes U-phase, V-phase and W-phase windings as the plural-phase windings. The respective U-phase, V-phase and W-phase windings include forward windings and reverse windings which are not directly connected. The present electric motor system further includes first and second inverters as the inverter, and first and second zero-phase switching arms as the zero-phase switching arm. In the present electric motor system, the forward windings and the reverse windings of the respective phases are arranged at teeth defined for the forward windings and the reverse windings of the respective phases among a plurality of the teeth. The first inverter, to which respective first ends of the U-phase forward winding, the V-phase reverse winding, and the W-phase forward winding are connected, applies a current for generating rotating fluxes around the rotor, to the U-phase forward winding, the V-phase reverse winding, and the W-phase forward winding. The first zero-phase switching arm, to which respective second ends of the U-phase forward winding, the V-phase reverse winding, and the W-phase forward winding are commonly connected, adjusts a zero-phase current flowing through a common connection point of the U-phase forward winding, the V-phase reverse winding and the W-phase forward winding. The second inverter, to which respective first ends of the U-phase reverse winding, the V-phase forward winding, and the W-phase reverse winding are connected, applies a current for generating rotating fluxes around the rotor, to the U-phase reverse winding, the V-phase forward winding, and the W-phase reverse winding. The second zero-phase switching arm, to which respective second ends of the U-phase reverse winding, the V-phase forward winding, and the W-phase reverse winding are commonly connected, adjusts a zero-phase current flowing through a common connection point of the U-phase reverse winding, the V-phase forward winding, and the W-phase reverse winding.

Preferably, in the first electric motor system, the respective plural-phase windings include forward windings and reverse windings which are not directly connected. The present electric motor system further includes first and second inverters as the inverter, and first and second zero-phase switching arms as the zero-phase switching arm. The first inverter, to which respective first ends of the plural-phase forward windings are connected, applies a current for generating rotating fluxes around the rotor to the plural-phase forward windings. The first zero-phase switching arm, to which respective second ends of the plural-phase forward windings are commonly connected, adjusts a zero-phase current flowing through a common connection point of the plural-phase forward windings. The second inverter, to which respective first ends of the plural-phase reverse windings are connected, applies a current for generating rotating fluxes around the rotor to the plural-phase reverse windings. The second zero-phase switching arm, to which respective second ends of the plural-phase reverse windings are commonly connected, adjusts a zero-phase current flowing through a common connection point of the plural-phase reverse windings.

According to the technology of the present disclosure, it is possible to increase torque generated at a rotor of an electric motor.

The foregoing and other objects, features, and advantages of the present disclosure will be more clarified by the following detailed descriptions with reference to the accompanying drawings.

The present disclosure relates to a technology of adjusting a current flowing through a stator coil of an electric motor to control torque generated at a rotor. Respective embodiments of the technology of the present disclosure will be described below with reference to respective drawings. The same reference numerals will be assigned to the same components illustrated in a plurality of drawings, and description thereof will be simplified.

First Embodiment

FIG. 1 illustrates a configuration of an electric motor system 1 according to a first embodiment. The electric motor system 1 according to the present embodiment includes a battery 10, an inverter 12, an electric motor 14, a zero-phase switching arm Z, and a control unit 18. The inverter 12 converts DC power output from the battery 10 into three-phase AC power and outputs the three-phase AC power to the electric motor 14. A rotor of the electric motor 14 rotates by the three-phase AC power output from the inverter 12. A neutral point N of the electric motor 14 is connected to the zero-phase switching arm Z. As will be described later, in the electric motor system 1 according to the present embodiment, a zero-phase current flowing through respective windings of the electric motor 14 is adjusted by switching of the zero-phase switching arm Z. By this configuration, in the electric motor system 1 according to the present embodiment, torque is generated at the rotor also using the zero-phase current as well as a three-phase AC current flowing through the respective windings.

A specific configuration and operation of the electric motor system 1 according to the present embodiment will be described. The electric motor 14 includes a U-phase winding 20U, a V-phase winding 20V, and a W-phase winding 20W which constitute a concentrated winding stator coil. Further, the electric motor 14 includes a U-phase terminal 22u, a V-phase terminal 22v, a W-phase terminal 22w, and a rotor. Respective first ends (one ends) of the U-phase winding 20U, the V-phase winding 20V, and the W-phase winding 20W are commonly connected at the neutral point N. The second end (other end) of the U-phase winding 20U, the second end (other end) of the V-phase winding 20V, and the second end (other end) of the W-phase winding 20W are respectively connected to the U-phase terminal 22u, the V-phase terminal 22v, and the W-phase terminal 22w. Specifically, the second end of the U-phase winding 20U is connected to the U-phase terminal 22u, the second end of the V-phase winding 20V is connected to the V-phase terminal 22v, and the second end of the W-phase winding 20W is connected to the W-phase terminal 22w. As a result of a three-phase AC current flowing through the U-phase terminal 22u, the V-phase terminal 22v, and the W-phase terminal 22w, the U-phase winding 20U, the V-phase winding 20V, and the W-phase winding 20W generate rotating fluxes inside the electric motor 14. The rotor rotates in synchronization with the rotating fluxes.

The control unit 18 includes, for example, an arithmetic processing device such as a processor and a memory. The control unit 18 operates by a program stored in the memory or a program loaded via an external I/F being executed by the processor. The control unit 18 performs switching control of the inverter 12 and the zero-phase switching arm Z.

The inverter 12 includes a plurality of switching arms U, V and W. The switching arm U includes an upper switching element S1 and a lower switching element S2 which are connected in series. The switching arm V includes an upper switching element S3 and a lower switching element S4 which are connected in series. The switching arm W includes an upper switching element S5 and a lower switching element S6 which are connected in series.

The switching arms U, V and W are connected in parallel, and upper ends (first ends) of these switching arms are connected to a positive electrode terminal of the battery 10, and lower ends (second ends) are connected to a negative electrode terminal of the battery 10.

The U-phase terminal 22u of the electric motor 14 is connected to a connection point of the upper switching element S1 and the lower switching element S2 of the switching arm U. The V-phase terminal 22v of the electric motor 14 is connected to a connection point of the upper switching element S3 and the lower switching element S4 of the switching arm V. The W-phase terminal 22w of the electric motor 14 is connected to a connection point of the upper switching element S5 and the lower switching element S6 of the switching arm W.

The zero-phase switching arm Z includes an upper switching element A1 and a lower switching element A2 which are connected in series. The neutral point N of the electric motor 14 is connected to a connection point of the upper switching element A1 and the lower switching element A2. An upper end (first end of the zero-phase switching arm Z) of the upper switching element A1 is connected to the positive electrode terminal of the battery 10. A lower end (second end of the zero-phase switching arm Z) of the lower switching element A2 is connected to the negative electrode terminal of the battery 10.

Semiconductor devices such as insulated gate bipolar transistors (IGBTs) and metal oxide semiconductor field effect transistors (MOSFETs) may be used as the switching elements provided at the inverter 12 and the zero-phase switching arm Z. FIG. 1 illustrates an example where IGBTs are used as the switching elements. In the respective IGBTs, diodes D are connected between collector terminals and the emitter terminals so that anode terminals are provided on an emitter terminal side.

Figure 2:
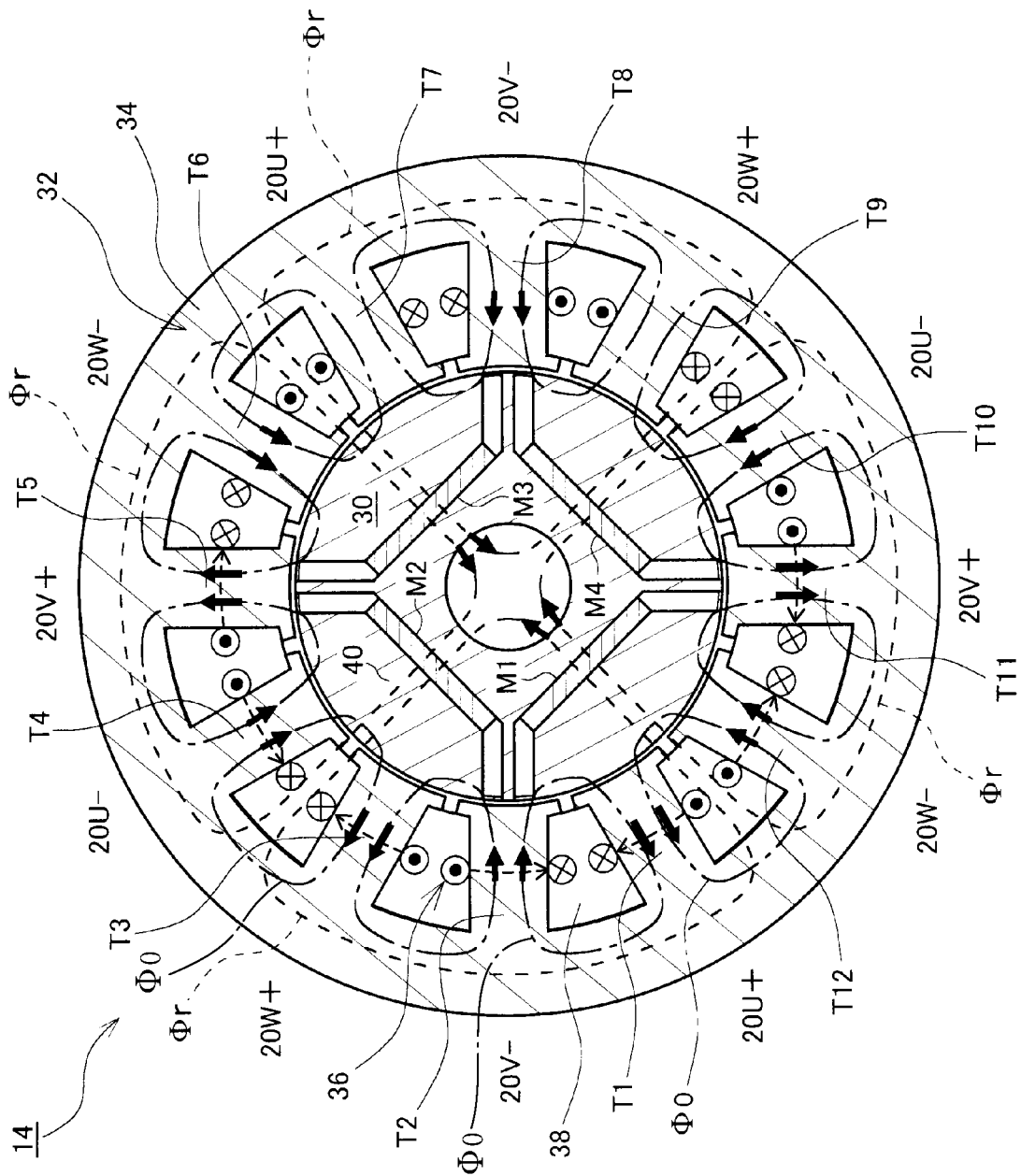
FIG. 2 is a view illustrating a cross-section of an electric motor.

FIG. 2 illustrates a cross-section perpendicular to an axial direction of the electric motor 14. The electric motor 14 includes a rotor 30, a stator core 32, and a concentrated winding stator coil 36. The stator core 32 includes a stator core body portion 34 and a plurality of teeth T1 to T12. The stator core body portion 34 has a cylindrical hollow portion. FIG. 2 illustrates an example of the stator core 32 in which twelve teeth T1 to T12 are provided. The teeth T1 to T12 are arranged along a circumferential direction on an inner wall surface of the stator core body portion 34. The respective teeth T1 to T12 project to an inner side (toward the rotor 30) of the stator core 32. Each of the teeth T1 to T12 has a shape extending toward a rotational axis of the electric motor 14 in a cross-sectional shape illustrated in FIG. 2. Flanges projecting in a circumferential direction are formed at tip portions of the respective teeth T1 to T12. Slots 38 are formed between adjacent teeth. In other words, twelve slots 38 (12 slots) arranged in a circumferential direction are formed at the stator core 32 by twelve teeth T1 to T12.

The U-phase winding 20U includes a U-phase forward winding 20U+ and a U-phase reverse winding 20U−. The U-phase forward windings 20U+ are constituted with conductive wires wound around the teeth T1 and T7. The U-phase reverse windings 20U− are constituted with conductive wires wound around the teeth T4 and T10.

Here, the forward winding and the reverse winding refer to two types of windings whose directions of winding conductive wires around the teeth are opposite to each other. When a current flows from the forward winding and the reverse winding to the neural point or when a current flows from the neural point to the forward winding and the reverse winding, magnetic fluxes in directions opposite to each other are generated at the tooth at which the forward winding is provided and the tooth at which the reverse winding is provided.

The V-phase winding 20V includes a V-phase forward winding 20V+ and a V-phase reverse winding 20V−. The V-phase forward windings 20V+ are constituted with conductive wires wound around the teeth T5 and T11. The V-phase reverse windings 20V− are constituted with conductive wires wound around the teeth T2 and T8.

The W-phase winding 20W includes a W-phase forward winding 20W+ and a W-phase reverse winding 20W−. The W-phase forward windings 20W+ are constituted with conductive wires wound around the teeth T3 and T9. The W-phase reverse windings 20W− are constituted with conductive wires wound around the teeth T6 and T12.

As a result of a three-phase AC current flowing through the U-phase winding 20U (20U+, 20U−), the V-phase winding 20V (20V+, 20V−), and the W-phase winding 20W (20W+, 20W−), rotating fluxes Φr are generated inside the stator core 32. In other words, a magnetic flux from outside to inside and a magnetic flux from inside to outside are generated at an interval of a mechanical angle of 90°. The magnetic fluxes rotate in synchronization with the three-phase AC current flowing through the U-phase winding 20U, the V-phase winding 20V, and the W-phase winding 20W. In other words, the rotating fluxes Φr are generated around the rotor 30.

In this manner, the electric motor 14 includes the rotor 30, the stator core 32 and the concentrated winding stator coil 36. The stator core body portion 34 encloses the rotor 30. The teeth T1 to T12 respectively project toward the rotor 30 from a wall surface of the stator core body portion 34 and are arranged in a circular manner. The concentrated winding stator coil 36 includes U-phase, V-phase and W-phase windings. The concentrated winding stator coils 36 are arranged at teeth defined in advance as targets around which the windings are to be wound among the teeth T1 to T12. With this configuration, in the electric motor system 1 according to the present embodiment, a 2-pole 6-slot concentrated winding stator is constituted with the stator core 32, the U-phase winding 20U, the V-phase winding 20V, and the W-phase winding 20W.

The rotor 30 includes a cylindrical rotor body portion 40, and four permanent magnets M1 to M4. The rotor body portion 40 is disposed in a hollow portion of the stator core body portion 34 coaxially with the hollow portion. The permanent magnets M1 to M4 extend in the axial direction of the electric motor 14 assuming that a direction perpendicular to a radial direction of the rotor 30 is a width direction. The permanent magnets M1 to M4 are arranged in a circular manner so that polarity of the permanent magnet becomes opposite to polarity of the adjacent permanent magnet. In the electric motor system 1 according to the present embodiment, torque is generated at the rotor 30 by magnetic interaction between the rotating fluxes Φr generated inside the stator core 32 and the permanent magnets M1 to M4 provided at the rotor 30. As a result of this, the rotor 30 rotates at rotation speed in synchronization with the rotating fluxes Φr.

FIG. 2 indicates directions of a zero-phase current flowing through the respective windings at certain time with dotted arrows, black circles and "X" marks. The black circles indicate a zero-phase current flowing in a direction away from a drawing plane of the drawing, and "X" marks indicate a zero-phase current flowing toward the drawing plane of the drawing. In other words, the zero-phase current flows in directions of dotted arrows illustrated in FIG. 2. In a case where the zero-phase current in the directions illustrated in FIG. 2 flows through the respective windings, zero-phase magnetic fluxes Φ0 in directions indicated with dashed-dotted arrows in FIG. 2 are generated at the respective teeth T1 to T12. In the electric motor system 1 according to the present embodiment, as will be described later, the zero-phase current is adjusted so that torque is generated at the rotor 30 by magnetic interaction between the zero-phase magnetic fluxes Φ0 and the rotor 30.

Figure 3:
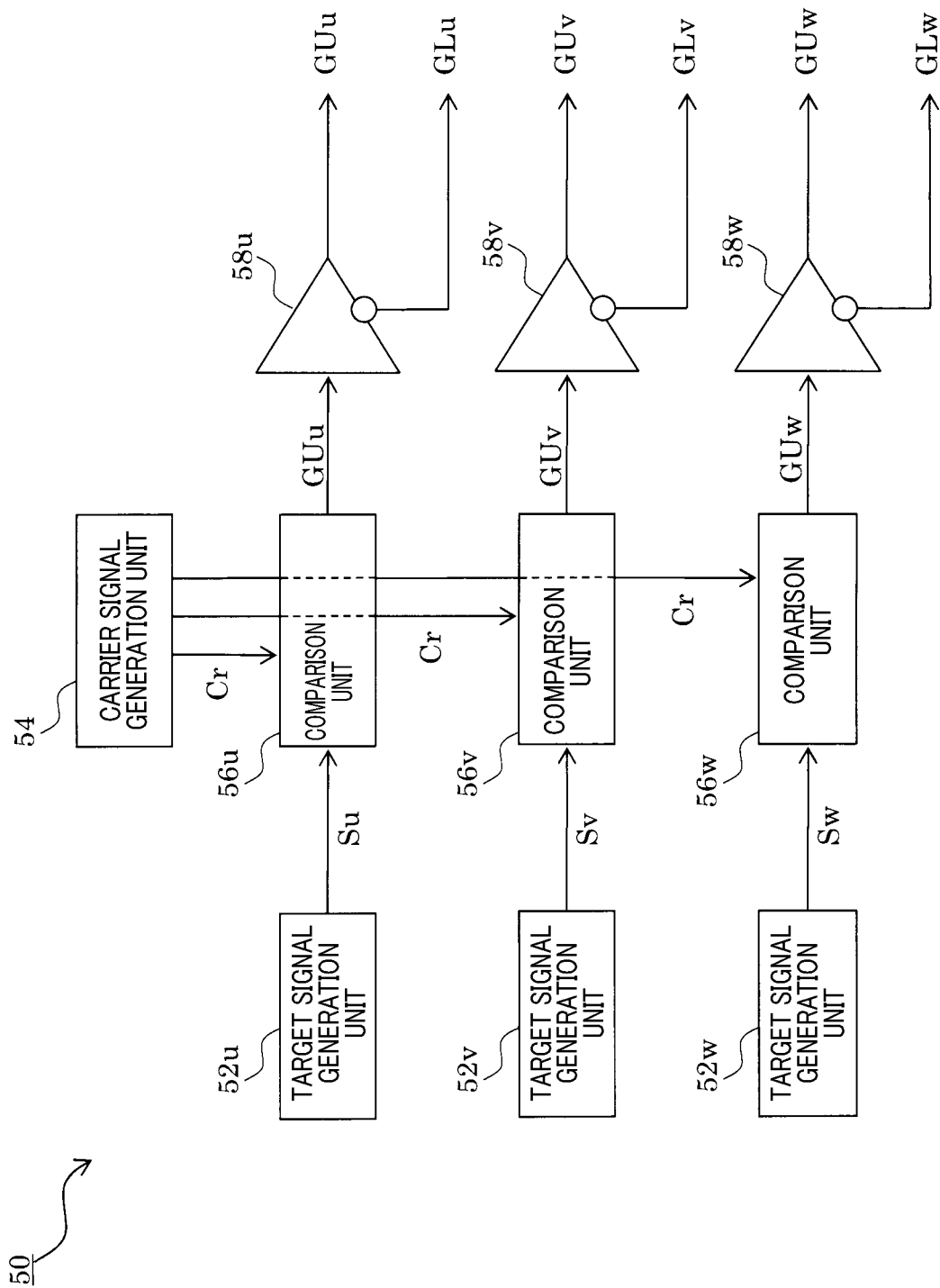
FIG. 3 is a view illustrating a configuration of an inverter control unit.

FIG. 3 illustrates a configuration of the inverter control unit 50 included in the control unit 18. The inverter control unit 50 includes a carrier signal generation unit 54, a plurality of target signal generation units 52u, 52v and 52w, a plurality of comparison units 56u, 56v and 56w, and a plurality of buffers 58u, 58v and 58w.

The carrier signal generation unit 54 generates a carrier signal Cr and outputs the carrier signal Cr to the comparison units 56u, 56v and 56w. The carrier signal Cr may be a signal whose time waveform is a triangle wave. The target signal generation units 52u, 52v and 52w respectively generate target signals Su, Sv and Sw indicating target values for a U-phase current flowing through the U-phase winding 20U of the electric motor 14, a V-phase current flowing through the V-phase winding 20V and a W-phase current flowing through the W-phase winding 20W. Specifically, the target signal generation unit 52u generates the target signal Su indicating the target value for the U-phase current flowing through the U-phase winding 20U. The target signal generation unit 52v generates the target signal Sv indicating the target value for the V-phase current flowing through the V-phase winding 20V. The target signal generation unit 52w generates the target signal Sw indicating the target value for the W-phase current flowing through the W-phase winding 20W. The generated target signals Su, Sv and Sw are respectively output to the comparison units 56u, 56v and 56w. Specifically, the target signal Su is output to the comparison unit 56u. The target signal Sv is output to the comparison unit 56v. The target signal Sw is output to the comparison unit 56w. The target signals Su, Sv and Sw may be sine wave signals having a phase difference of one another of 120°.

The comparison unit 56u generates a control signal GUu on the basis of a comparison result between the target signal Su and the carrier signal Cr and outputs the control signal GUu to the buffer 58u. Specifically, the comparison unit 56u generates the control signal GUu which becomes high in a period during which a value of the target signal Su is greater than a value of the carrier signal Cr and which becomes low in a period during which the value of the target signal Su is equal to or less than the value of the carrier signal Cr, and outputs the control signal GUu to the buffer 58u. The buffer 58u outputs the control signal (first control signal) GUu input from the comparison unit 56u and a control signal GLu (second control signal) obtained by inverting high and low states of the control signal GUu. In other words, the buffer 58u outputs the control signal GUu whose signal value is high and the control signal GLu whose signal value is low. Alternatively, the buffer 58u outputs the control signal GUu whose signal value is low and the control signal GLu whose signal value is high. Note that the control signals GUu and GLu are signals which control the respective switching elements S1 and S2 of the switching arm U provided at the inverter 12.

The comparison unit 56v generates a control signal GUv on the basis of a comparison result between the target signal Sv and the carrier signal Cr and outputs the control signal GUv to the buffer 58v through similar processing. The buffer 58v outputs the control signal GUv and a control signal GLv obtained by inverting high and low states of the control signal GUv. Note that the control signals GUv and GLv are signals which control the respective switching elements S3 and S4 of the switching arm V provided at the inverter 12.

The comparison unit 56w generates a control signal GUw on the basis of a comparison result between the target signal Sw and the carrier signal Cr and outputs the control signal GUw to the buffer 58w through similar processing. The buffer 58w outputs the control signal GUw and a control signal GLw obtained by inverting high and low states of the control signal GUw. Note that the control signals GUw and GLw are signals which control the respective switching elements S5 and S6 of the switching arm W provided at the inverter 12.

At the inverter 12 illustrated in FIG. 1, the upper switching element S1 of the switching arm U is switched on when the control signal GUu is high and switched off when the control signal GUu is low. The lower switching element S2 of the switching arm U is switched on when the control signal GLu is high and switched off when the control signal GLu is low.

The upper switching element S3 of the switching arm V is switched on when the control signal GUv is high and switched off when the control signal GUv is low. The lower switching element S4 of the switching arm V is switched on when the control signal GLv is high and switched off when the control signal GLv is low.

The upper switching element S5 of the switching arm W is switched on when the control signal GUw is high and switched off when the control signal GUw is low. The lower switching element S6 of the switching arm W is switched on when the control signal GLw is high and switched off when the control signal GLw is low.

In the electric motor system 1 according to the present embodiment, by the respective switching elements S1 to S6 provided at the inverter 12 being controlled by the inverter control unit 50, the three-phase AC current flows through the U-phase winding 20U, the V-phase winding 20V and the W-phase winding 20W of the electric motor 14. As a result of this, in the electric motor system 1 according to the present embodiment, rotating fluxes Φr are generated inside the stator core 32, and torque is generated at the rotor 30 by magnetic interaction between the rotating fluxes Φr and the rotor 30.

Figure 4:
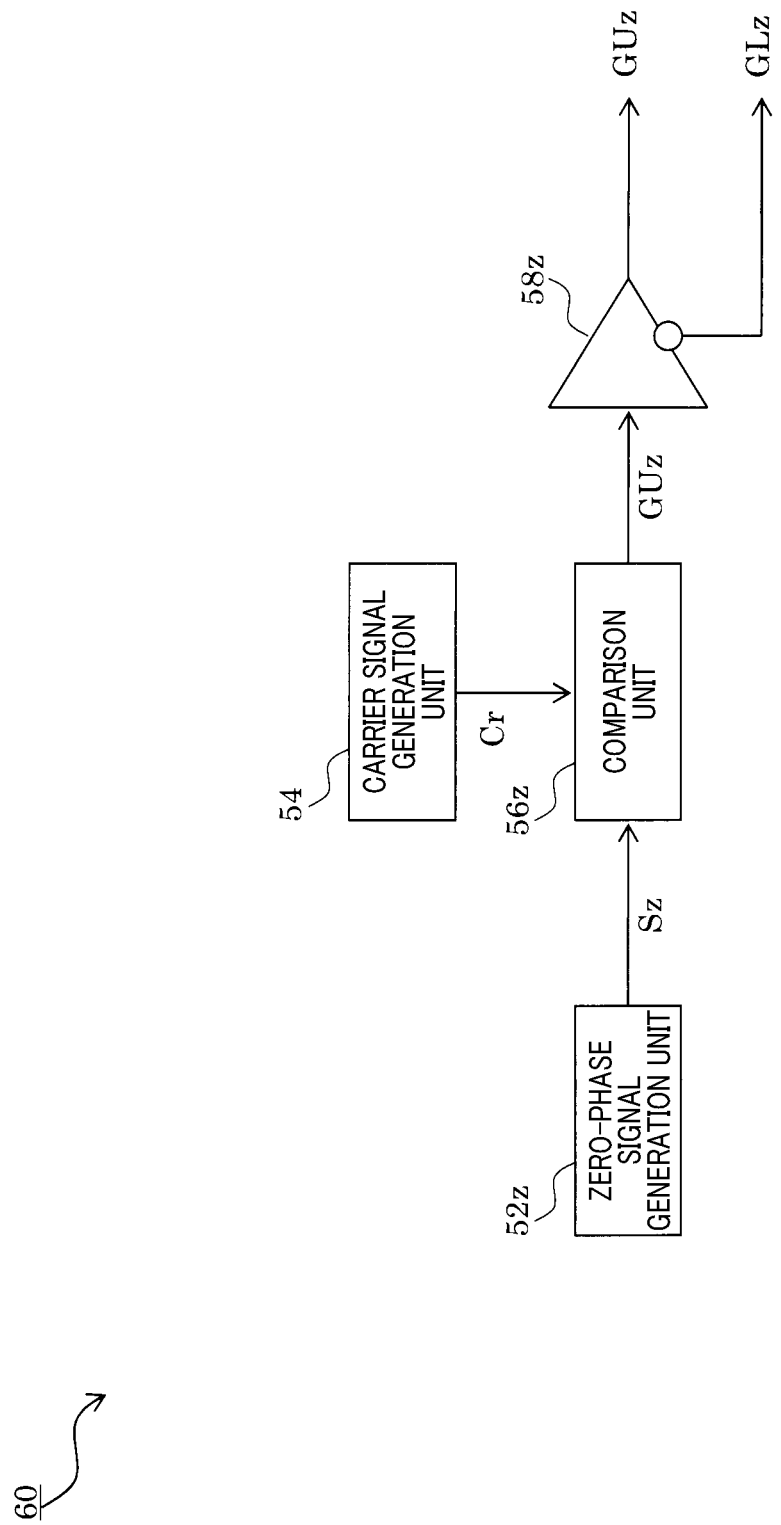
FIG. 4 is a view illustrating a configuration of a zero-phase control unit.

FIG. 4 illustrates a configuration of a zero-phase control unit 60 included in the control unit 18. The zero-phase control unit 60 includes a carrier signal generation unit 54, a zero-phase signal generation unit 52z, a comparison unit 56z and a buffer 58z.

The carrier signal generation unit 54 generates a carrier signal Cr and outputs the carrier signal Cr to the comparison unit 56z. The zero-phase signal generation unit 52z generates a zero-phase signal Sz indicating a target value for the zero-phase current and outputs the zero-phase signal Sz to the comparison unit 56z. The zero-phase signal Sz may be a sine wave signal having a frequency three times as high as frequencies of the target signals Su, Sv and Sw.

The comparison unit 56z generates a control signal GUz on the basis of a comparison result between the zero-phase signal Sz and the carrier signal Cr and outputs the control signal GUz to the buffer 58z. The buffer 58z outputs the control signal (third control signal) GUz input from the comparison unit 56z and a control signal (fourth control signal) GLz obtained by inverting high and low states of the control signal GUz. Note that the control signals GUz and GLz are signals which control the respective switching elements A1 and A2 provided at the zero-phase switching arm Z.

At the zero-phase switching arm Z illustrated in FIG. 1, the upper switching element A1 is switched on when the control signal GUz is high and switched off when the control signal GUz is low. The lower switching element A2 is switched on when the control signal GLz is high and switched off when the control signal GLz is low.

According to switching control to be executed by the zero-phase control unit 60, the zero-phase current which generates torque at the rotor 30 by zero-phase magnetic fluxes Φ0 inside the stator core 32 flow through the U-phase winding 20U, the V-phase winding 20V and the W-phase winding 20W on the basis of principle which will be described later. By this means, in the electric motor system 1 according to the present embodiment, it is possible to increase torque by the zero-phase current by causing the zero-phase current to contribute to the torque, as well as the three-phase AC current. Further, in the electric motor system 1 according to the present embodiment, the zero-phase current is caused to contribute to the torque as well as the three-phase AC current, so that utilization efficiency of power output from the battery 10 is improved. Still further, the zero-phase magnetic fluxes Φ0 are distributed across a plurality of teeth T1 to T12 and pass through flux paths different from flux paths of the rotating fluxes Φr. Thus, utilization efficiency of an iron core at the stator core 32 is improved.

Figure 5:
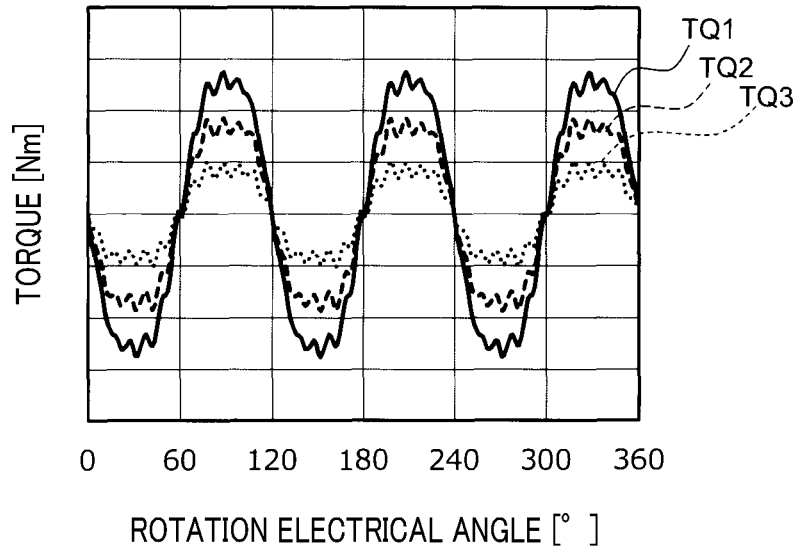
FIG. 5 is a view illustrating torque in a case where a zero-phase current is made temporally constant.

The principle of generating torque at the rotor using the zero-phase magnetic fluxes will be described. FIG. 5 illustrates torque in a case where the zero-phase current is made temporally constant as characteristics for explaining the principle. FIG. 5 indicates a rotation electrical angle of the rotor on a horizontal axis and indicates torque generated at the rotor on a vertical axis. The rotor rotates in synchronization with the rotating fluxes. A magnitude (absolute value) of the zero-phase current when torque TQ1 is generated at the rotor is greater than a magnitude of the zero-phase current when torque TQ2 is generated at the rotor. The magnitude of the zero-phase current when the torque TQ2 is generated at the rotor is greater than a magnitude of the zero-phase current when torque TQ3 is generated at the rotor.

Figure 6:
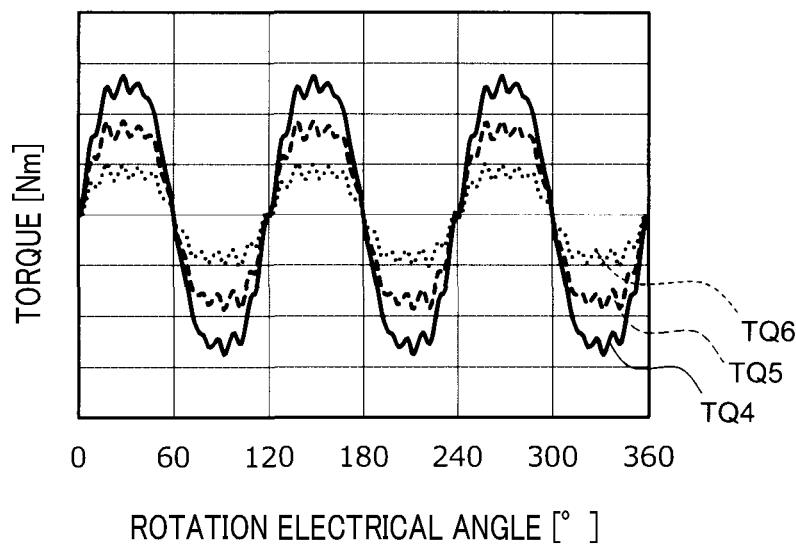
FIG. 6 is a view illustrating torque in a case where polarity of the zero-phase current is reversed with respect to polarity in FIG. 5.

FIG. 6 illustrates torque in a case where polarity (flowing direction) of the zero-phase current is reversed with respect to polarity in FIG. 5 while the zero-phase current is made temporally constant as characteristics for explaining the principle. A magnitude of the zero-phase current when torque TQ4 is generated at the rotor is greater than a magnitude of the zero-phase current when torque TQ5 is generated at the rotor. The magnitude of the zero-phase current when the torque TQ5 is generated at the rotor is greater than a magnitude of the zero-phase current when torque TQ6 is generated at the rotor.

As illustrated in FIG. 5 and FIG. 6, the polarity of the torque changes every time the rotation electrical angle increases by 60°. Thus, with the DC zero-phase current, a direction of torque generated at the rotor using the zero-phase magnetic fluxes Φ0 does not become a constant direction. It is therefore difficult to cause the zero-phase magnetic fluxes Φ0 to contribute to the torque of the rotor.

As is clear from the comparison between FIG. 5 and FIG. 6, in a case where the polarity of the zero-phase current is inverted, the direction of the torque generated at the rotor becomes opposite. Further, as the magnitude of the zero-phase current is greater, the magnitude of the torque is greater. Thus, the electric motor system 1 according to the present embodiment employs a configuration where the direction of the torque is made constant by applying such a zero-phase current of a sine wave that the polarity of the zero-phase current is inverted every time the rotation electrical angle increases by 60°, to the respective windings. Such a zero-phase current is a zero-phase current having a cycle of 120° in terms of the rotation electrical angle. A frequency of such a zero-phase current is three times as high as frequencies of the three-phase AC current flowing through the U-phase winding 20U, the V-phase winding 20V and the W-phase winding 20W.

This operation principle will be described with reference to FIG. 2. Directions of the zero-phase magnetic fluxes Φ0 are opposite between adjacent teeth. As illustrated in FIG. 2, the zero-phase magnetic flux Φ0 is headed from inside to outside at the tooth T1 at given time. Further, the zero-phase magnetic flux Φ0 is headed from outside to inside at the tooth T2. The zero-phase magnetic flux Φ0 is headed from inside to outside at the tooth T3. Hereafter, the directions of the zero-phase magnetic fluxes Φ0 become alternately opposite at the teeth T4, T5, ..., T12. Thus, the electric motor system 1 according to the present embodiment changes the zero-phase current so that the directions of the zero-phase magnetic fluxes Φ0 become opposite when the magnetic pole of the rotor 30 rotates from a position of a given tooth to a position of the adjacent tooth. As a result of this, the directions of the zero-phase magnetic fluxes Φ0 seen from the magnetic pole of the rotor 30 become the same, so that torque is generated in a constant direction. A mechanical angle at which the rotor 30 rotates by an amount corresponding to an interval of teeth is 30°, and the rotation electrical angle is 60°. In other words, the direction of the torque generated at the rotor 30 becomes constant by applying such a zero-phase current of a sine wave that the polarity is inverted every time the rotation electrical angle increases by 60°, to the respective windings.

Figure 7:
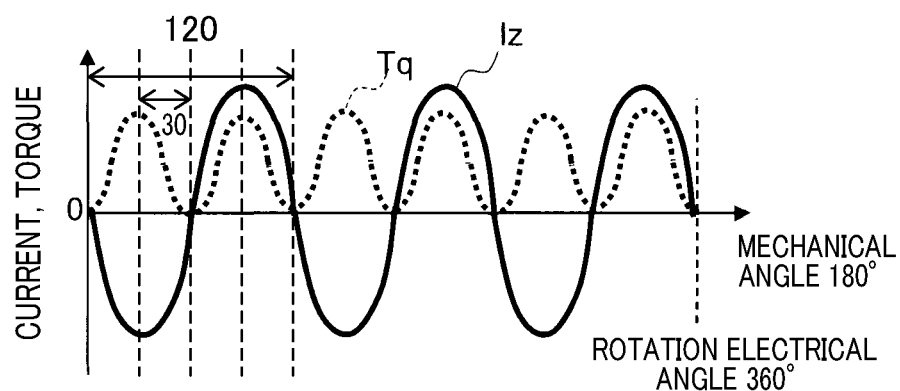
FIG. 7 is a view illustrating a zero-phase current and torque generated at a rotor by a zero-phase magnetic flux.

FIG. 7 illustrates a zero-phase current Iz flowing through the respective windings and torque Tq generated at the rotor 30 using the zero-phase magnetic fluxes Φ0. FIG. 7 indicates the rotation electrical angle of the rotor 30 on a horizontal axis and indicates the zero-phase current Iz and the torque Tq generated at the rotor 30 on a vertical axis. The zero-phase current Iz has a cycle of 120° in terms of the rotation electrical angle. The torque Tq repeatedly has a local maximum value and a local minimum value at an interval of the rotation electrical angle of 30°.

Second Embodiment

Figure 8:
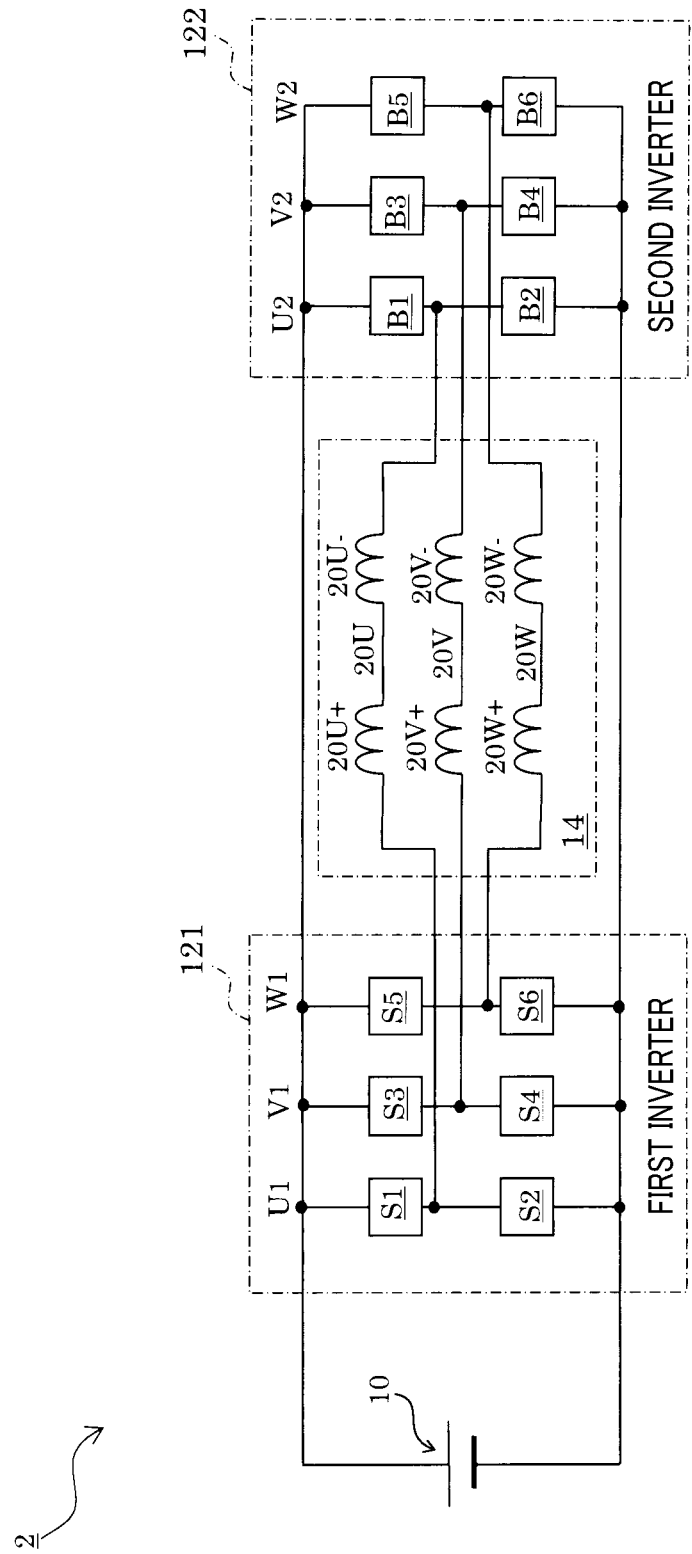
FIG. 8 is a view illustrating a configuration of an electric motor system according to a second embodiment.

FIG. 8 illustrates a configuration of an electric motor system 2 according to a second embodiment. The electric motor system 2 according to the present embodiment includes a battery 10, a first inverter 121, a second inverter 122, and an electric motor 14. The first inverter 121 has the same circuit configuration as that of the inverter 12 illustrated in FIG. 1. However, the switching arm U illustrated in FIG. 1 is indicated as a switching arm U1 in FIG. 8 to distinguish the first inverter 121 from the inverter 12 illustrated in FIG. 1. In a similar manner, the switching arm V is indicated as a switching arm V1, and the switching arm W is indicated as a switching arm W1.

The second inverter 122 includes a plurality of switching arms U2, V2 and W2. The switching arm U2 includes an upper switching element B1 and a lower switching element B2 which are connected in series. The switching arm V2 includes an upper switching element B3 and a lower switching element B4 which are connected in series. The switching arm W2 includes an upper switching element B5 and a lower switching element B6 which are connected in series.

The switching arms U2, V2 and W2 are connected in parallel, and upper ends of these switching arms are connected to a positive electrode terminal of the battery 10, and lower ends are connected to a negative electrode terminal of the battery 10.

FIG. 8 illustrates a U-phase forward winding 20U+ and a U-phase reverse winding 20U− which constitute a U-phase winding 20U. In a similar manner, FIG. 8 illustrates a V-phase forward winding 20V+ and a V-phase reverse winding 20V− which constitute a V-phase winding 20V and illustrates a W-phase forward winding 20W+ and a W-phase reverse winding 20W− which constitute a W-phase winding 20W.

In the electric motor system 1 according to the first embodiment, respective first ends of the U-phase winding 20U, the V-phase winding 20V and the W-phase winding 20W are connected to the neural point N, and the second ends of the respective windings are connected to the inverter 12. In contrast, in the electric motor system 2 according to the present embodiment, respective first ends (one ends) of the U-phase winding 20U, the V-phase winding 20V and the W-phase winding 20W are connected to the first inverter 121. The respective second ends (other ends) of the U-phase winding 20U, the V-phase winding 20V and the W-phase winding 20W are connected to the second inverter 122. Specifically, the second end of the U-phase winding 20U is connected to a connection point of the switching elements B1 and B2. The second end of the V-phase winding 20V is connected to a connection point of the switching elements B3 and B4. The second end of the W-phase winding 20W is connected to a connection point of the switching elements B5 and B6.

Figure 9:
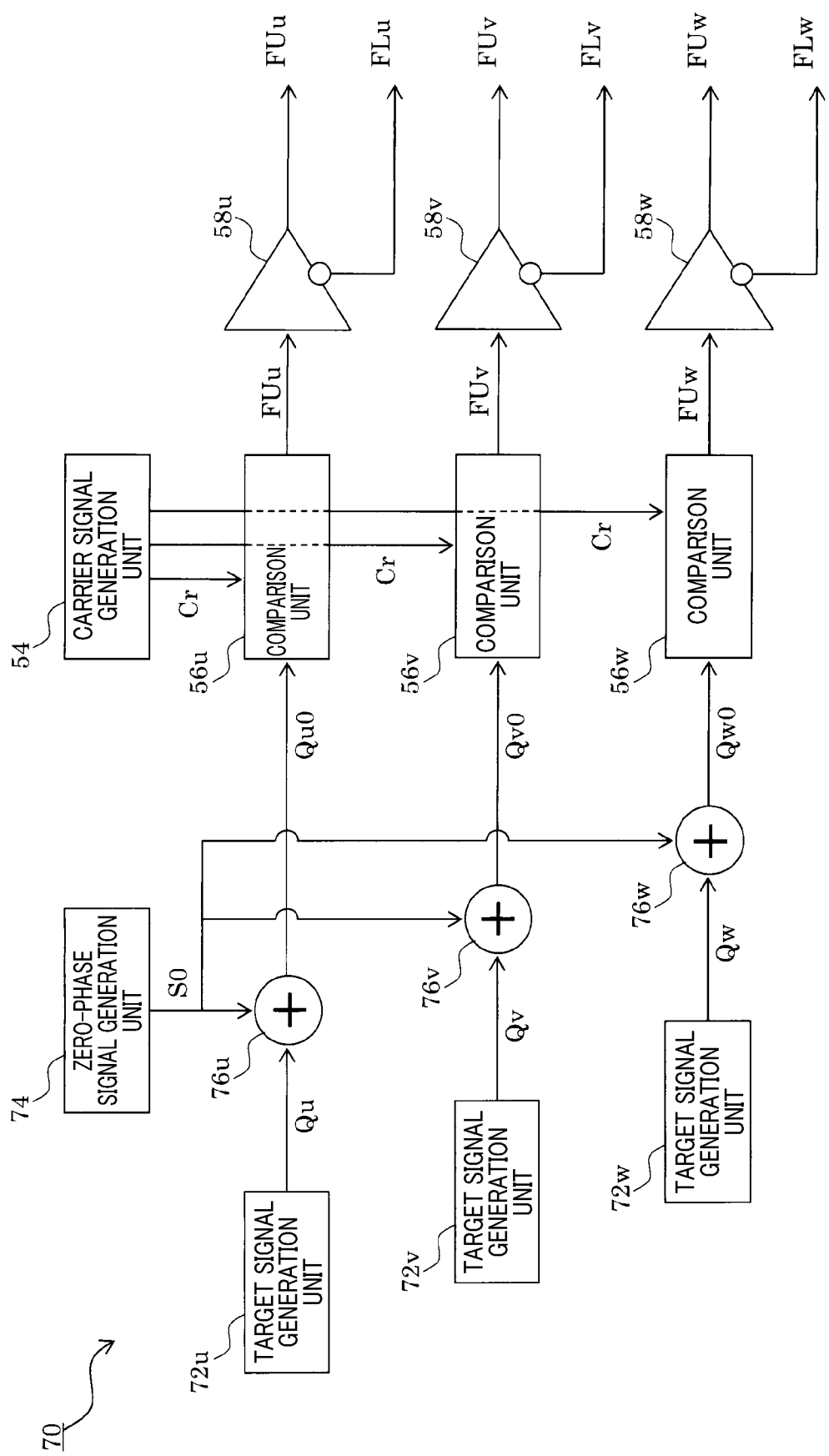
FIG. 9 is a view illustrating a configuration of a second inverter control unit.

The first inverter 121 is controlled by the inverter control unit 50 illustrated in FIG. 3 in a similar manner to the inverter 12 illustrated in FIG. 1. FIG. 9 illustrates a configuration of a second inverter control unit 70 included in the control unit 18. The second inverter 122 is controlled by the second inverter control unit 70. In other words, in the electric motor system 2 according to the present embodiment, the inverter control unit 50 illustrated in FIG. 3 corresponds to a first inverter control unit and controls the first inverter 121, and the second inverter control unit 70 illustrated in FIG. 9 controls the second inverter 122. The second inverter control unit 70 includes a carrier signal generation unit 54, a plurality of target signal generation units 72$u$, 72$v$ and 72$w$, a zero-phase signal generation unit 74, a plurality of adders 76$u$, 76$v$ and 76$w$, a plurality of comparison units 56$u$, 56$v$ and 56$w$, and a plurality of buffers 58$u$, 58$v$ and 58$w$.

The target signal generation units 72$u$, 72$v$ and 72$w$ respectively generate target signals Qu, Qv and Qw indicating target values for a U-phase current flowing through the U-phase winding 20U of the electric motor 14, a V-phase current flowing through the V-phase winding 20V, and a W-phase current flowing through the W-phase winding 20W. Specifically, the target signal generation unit 72$u$ generates the target signal Qu indicating the target value for the U-phase current flowing through the U-phase winding 20U. The target signal generation unit 72$v$ generates the target signal Qv indicating the target value for the V-phase current flowing through the V-phase winding 20V The target signal generation unit 72$w$ generates the target signal Qw indicating the target value for the W-phase current flowing through the W-phase winding 20W. The generated target signals Qu, Qv and Qw are respectively output to the adders 76$u$, 76$v$ and 76$w$. Specifically, the target signal Qu is output to the adder 76$u$. The target signal Qv is output to the adder 76$v$. The target signal Qw is output to the adder 76$w$. The target signals Qu, Qv and Qw may be sine wave signals having a phase difference of one another of 120°.

The zero-phase signal generation unit 74 generates a zero-phase signal S0 indicating a target value for a zero-phase current flowing through the U-phase winding 20U, the V-phase winding 20V and the W-phase winding 20W and outputs the zero-phase signal S0 to the adders 76$u$, 76$v$ and 76$w$. The zero-phase signal S0 may be a sine wave signal having a frequency three times as high as frequencies of the target signals Qu, Qv and Qw.

The adder 76$u$ adds the zero-phase signal S0 to the target signal Qu and outputs a U-phase target signal Qu0 obtained as an addition result to the comparison unit 56$u$. The adder 76$v$ adds the zero-phase signal S0 to the target signal Qv and outputs a V-phase target signal Qv0 obtained as an addition result to the comparison unit 56$v$. The adder 76$w$ adds the zero-phase signal S0 to the target signal Qw and outputs a W-phase target signal Qw0 obtained as an addition result to the comparison unit 56$w$.

The carrier signal generation unit 54 generates a carrier signal Cr and outputs the carrier signal Cr to the comparison units 56u, 56v and 56w. The comparison unit 56u generates a control signal FUu on the basis of a comparison result between the target signal Qu0 and the carrier signal Cr and outputs the control signal FUu to the buffer 58u. The buffer 58u outputs the control signal (first control signal) FUu input from the comparison unit 56u and a control signal (second control signal) FLu obtained by inverting high and low states of the control signal FUu. Note that the control signals FUu and FLu are signals which control the respective switching elements B1 and B2 of the switching arm U2 provided at the second inverter 122.

The comparison unit 56v generates a control signal FUv on the basis of a comparison result between the target signal Qv0 and the carrier signal Cr and outputs the control signal FUv to the buffer 58v. The buffer 58v outputs the control signal FUv and a control signal FLv obtained by inverting high and low states of the control signal FUv. The control signals FUv and FLv are signals which control the respective switching elements B3 and B4 of the switching arm V2 provided at the second inverter 122. The comparison unit 56w generates a control signal FUw on the basis of a comparison result between the target signal Qw0 and the carrier signal Cr and outputs the control signal FUw to the buffer 58w. The buffer 58w outputs the control signal FUw and a control signal FLw obtained by inverting high and low states of the control signal FUw. The control signals FUw and FLw are signals which control the respective switching elements B5 and B6 of the switching arm W2 provided at the second inverter 122.

At the second inverter 122 illustrated in FIG. 8, the upper switching element B1 of the switching arm U2 is switched on when the control signal FUu is high and switched off when the control signal FUu is low. The lower switching element B2 of the switching arm U2 is switched on when the control signal FLu is high and switched off when the control signal FLu is low.

The upper switching element B3 of the switching arm V2 is switched on when the control signal FUv is high and switched off when the control signal FUv is low. The lower switching element B4 of the switching arm V2 is switched on when the control signal FLv is high and switched off when the control signal FLv is low.

The upper switching element B5 of the switching arm W2 is switched on when the control signal FUw is high and switched off when the control signal FUw is low. The lower switching element B6 of the switching arm W2 is switched on when the control signal FLw is high and switched off when the control signal FLw is low.

In the electric motor system 2 according to the present embodiment, the first inverter 121 (respective switching elements S1 to S6) and the second inverter 122 (respective switching elements B1 to B6) are controlled by the inverter control unit 50 and the second inverter control unit 70, and a three-phase AC current flows through the U-phase winding 20U, the V-phase winding 20V and the W-phase winding 20W of the electric motor 14. As a result of this, in the electric motor system 2 according to the present embodiment, the rotating fluxes Φr are generated inside the stator core 32. Further, in the electric motor system 2 according to the present embodiment, the zero-phase current as illustrated in FIG. 7 flows through the U-phase winding 20U, the V-phase winding 20V and the W-phase winding 20W of the electric motor 14 by the second inverter 122 being controlled by the second inverter control unit 70. As a result of this, in the electric motor system 2 according to the present embodiment, torque is generated at the rotor 30 by magnetic interaction between the zero-phase magnetic fluxes Φ0 and the rotor 30 based on this zero-phase current.

Third Embodiment

Figure 10:
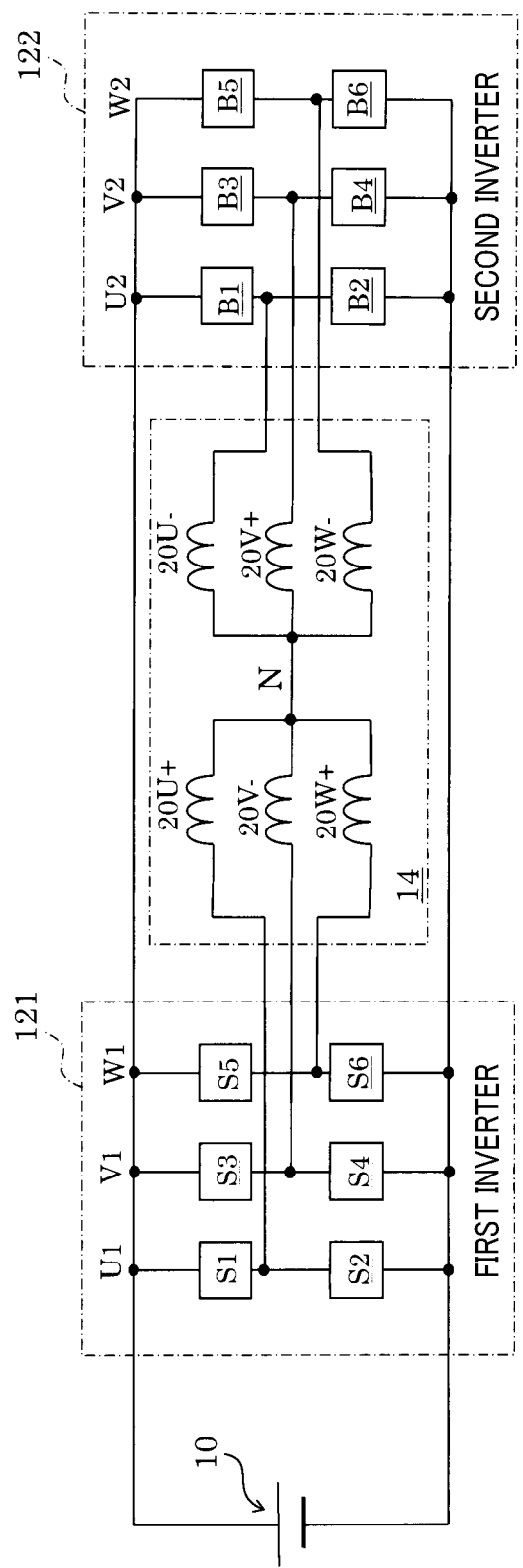
FIG. 10 is a view illustrating a configuration of an electric motor system according to a third embodiment.

FIG. 10 illustrates a configuration of an electric motor system 3 according to a third embodiment. The electric motor system 3 according to the present embodiment employs a configuration where a serial connection point of the U-phase forward winding 20U+ and the U-phase reverse winding 20U−, a serial connection point of the V-phase forward winding 20V+ and the V-phase reverse winding 20V−, and a serial connection point of the W-phase forward winding 20W+ and the W-phase reverse winding 20W− in the electric motor system 2 according to the second embodiment are commonly connected at the neural point N. Further, the electric motor system 3 according to the present embodiment employs a configuration where positions of the V-phase forward winding 20V+ and the V-phase reverse winding 20V− are switched. Operation of the first inverter 121 and the second inverter 122 is similar to the operation in the second embodiment.

The technical meaning of switching of the positions between the V-phase forward winding 20V+ and the V-phase reverse winding 20V− will be described. In the electric motor 14 in the first embodiment, as illustrated in FIG. 2, a current in the same direction flows through a plurality of conductive wires in one slot. In contrast, if the positions of the V-phase forward winding 20V+ and the V-phase reverse winding 20V− are switched as in the present embodiment, a current flows in a direction in which the magnetic fluxes weaken each other. Specifically, in slots in which the U-phase forward winding 20U+ and the W-phase reverse winding 20W− are located, and in slots other than slots in which the U-phase reverse winding 20U− and the W-phase forward winding 20W+ are located, a current flows through adjacent windings in an opposite direction, which weakens the magnetic fluxes. By this means, a spatial cycle of torque by the zero-phase magnetic fluxes Φ0 becomes 180° in terms of the rotation electrical angle and becomes 90° in terms of the mechanical angle. Thus, in a case where the rotor 30 rotates at the same speed in the configuration described in the first embodiment and in the configuration described in the present embodiment, a pulsation frequency of the torque by the zero-phase magnetic fluxes Φ0 becomes smaller in the electric motor system 3 according to the present embodiment than a pulsation frequency of the torque by the zero-phase magnetic fluxes Φ0 in the electric motor system 1 according to the first embodiment.

Note that the configuration where the first inverter 121 is controlled by the inverter control unit 50 corresponding to the first inverter, and the second inverter 122 is controlled by the second inverter control unit 70 has been described above. The technology of the present disclosure is not limited to this configuration. For example, the electric motor system 3 according to the present embodiment may employ a configuration where the first inverter 121 and the second inverter 122 are controlled by the second inverter control units 70 (two second inverter control units) individually provided for the respective inverters.

Fourth Embodiment

Figure 11:
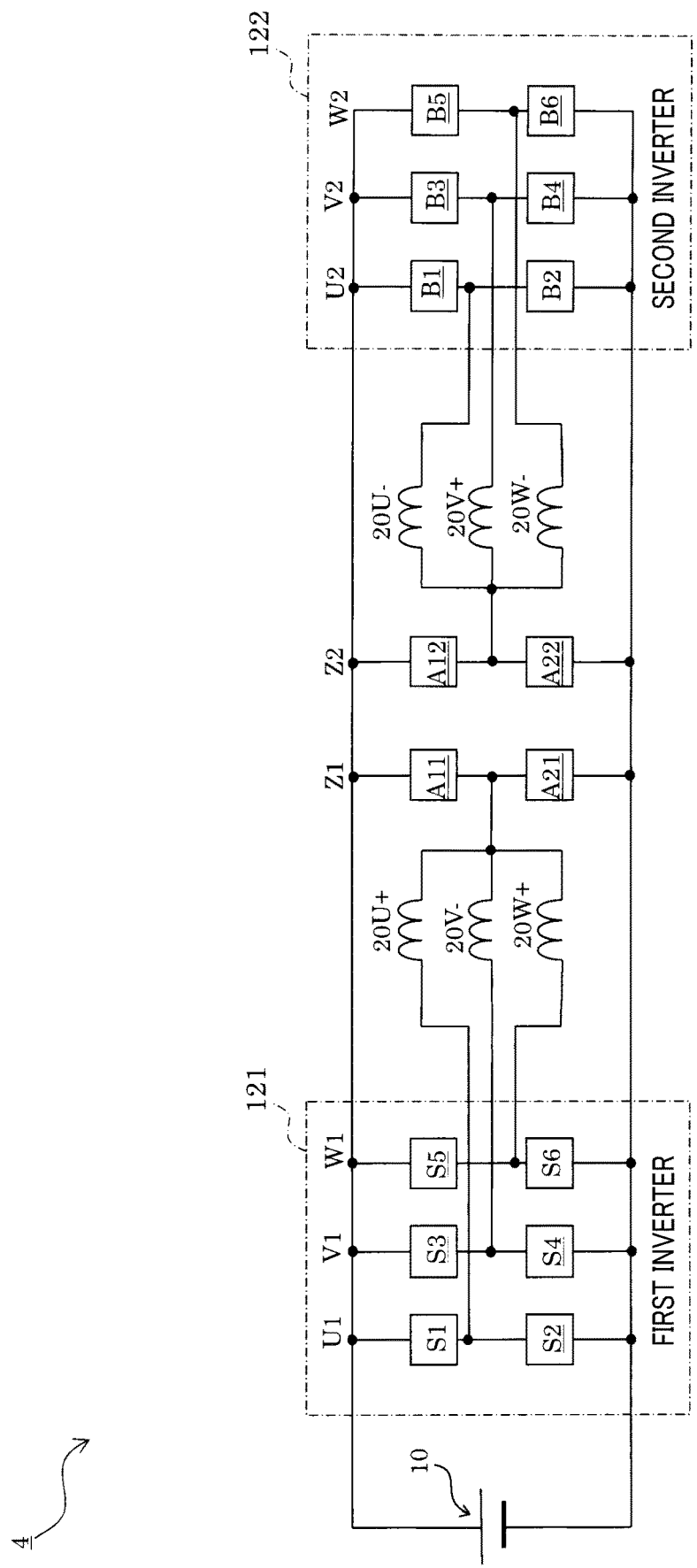
FIG. 11 is a view illustrating a configuration of an electric motor system according to a fourth embodiment.

FIG. 11 illustrates a configuration of an electric motor system 4 according to a fourth embodiment. The electric motor system 4 according to the present embodiment employs a configuration where a common connection point of the U-phase forward winding 20U+, the V-phase reverse winding 20V− and the W-phase forward winding 20W+ in the electric motor system 3 according to the third embodiment is connected to a first zero-phase switching arm Z1.

Further, the electric motor system 4 according to the present embodiment employs a configuration where a common connection point of the U-phase reverse winding 20U−, the V-phase forward winding 20V+ and the W-phase reverse winding 20W− in the electric motor system 3 according to the third embodiment is connected to a second zero-phase switching arm Z2. The forward windings and the reverse windings are individually provided in the respective phases and are not directly connected.

The first zero-phase switching arm Z1 includes switching elements A11 and A21 which are connected in series. The common connection point of the U-phase forward winding 20U+, the V-phase reverse winding 20V− and the W-phase forward winding 20W+ is connected to a connection point of the switching elements A11 and A21. An upper end of the switching element A11 is connected to a positive electrode terminal of the battery 10, and a lower end of the switching element A21 is connected to a negative electrode terminal of the battery 10.

The second zero-phase switching arm Z2 includes switching elements A12 and A22 which are connected in series. The common connection point of the U-phase reverse winding 20U−, the V-phase forward winding 20V+ and the W-phase reverse winding 20W− is connected to a connection point of the switching elements A12 and A22. An upper end of the switching element A12 is connected to the positive electrode terminal of the battery 10, and a lower end of the switching element A22 is connected to the negative electrode terminal of the battery 10.

The switching elements A11 and A12 which constitute the switching arm Z1 adjust a zero-phase current flowing through the U-phase forward winding 20U+, the V-phase reverse winding 20V− and the W-phase forward winding 20W+. The switching elements A21 and A22 which constitute the switching arm Z2 adjust a zero-phase current flowing through the U-phase reverse winding 20U−, the V-phase forward winding 20V+ and the W-phase reverse winding 20W−.

As a result of this, in the electric motor system 4 according to the present embodiment, zero-phase magnetic fluxes $\Phi 0$ which generate torque at the rotor 30 are generated at the U-phase forward winding 20U+, the V-phase reverse winding 20V−, the W-phase forward winding 20W+, the U-phase reverse winding 20U−, the V-phase forward winding 20V+ and the W-phase reverse winding 20W−.

Fifth Embodiment

Figure 12:
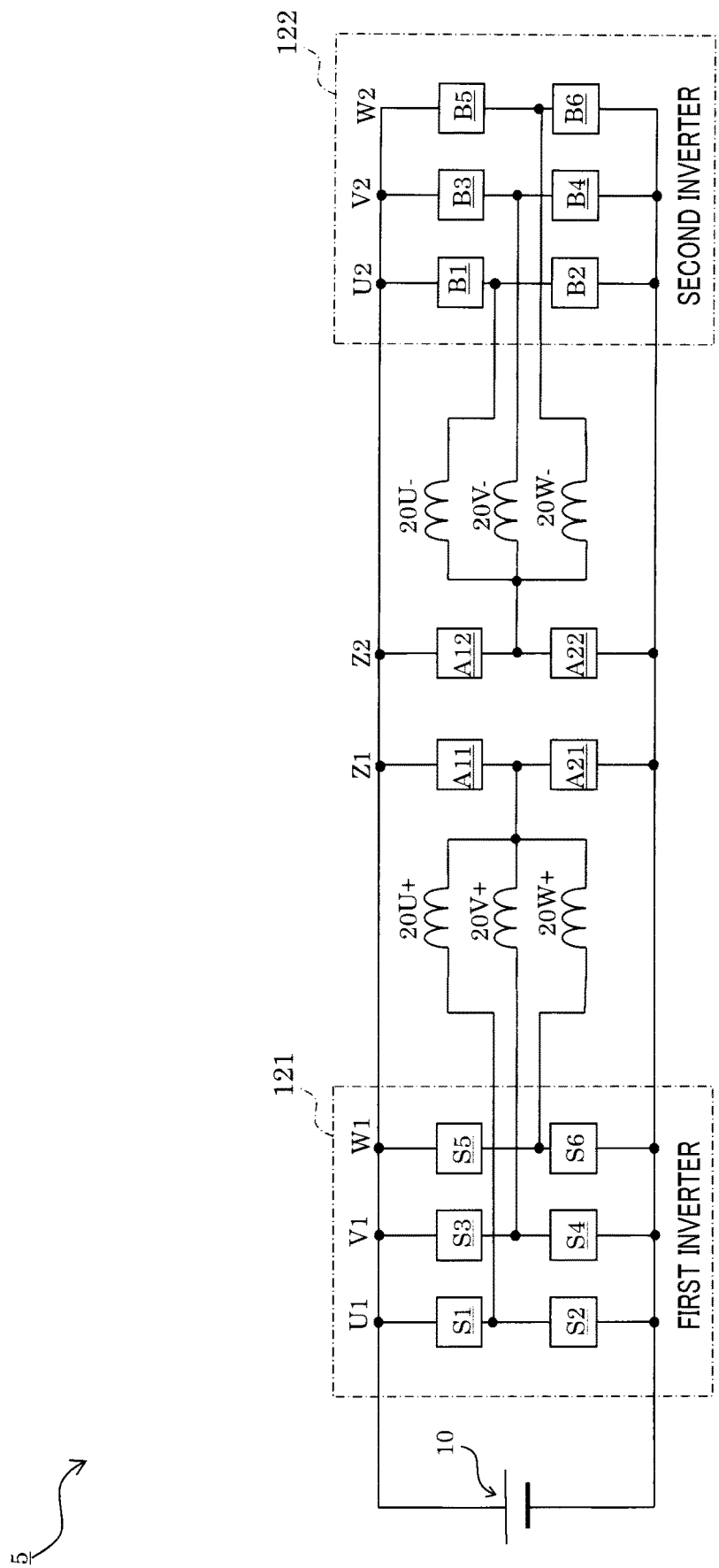
FIG. 12 is a view illustrating a configuration of an electric motor system according to a fifth embodiment.

FIG. 12 illustrates a configuration of an electric motor system 5 according to a fifth embodiment. The electric motor system 5 according to the present embodiment employs a configuration where positions of the V-phase forward winding 20V+ and the V-phase reverse winding 20V− in the electric motor system 4 according to the fourth embodiment are switched. In the electric motor system 4 according to the fourth embodiment, a spatial cycle of torque due to the zero-phase magnetic fluxes $\Phi 0$ becomes 180° in terms of the rotation electrical angle and becomes 90° in terms of the mechanical angle. In contrast, in the electric motor system 5 according to the present embodiment, a spatial cycle of torque due to the zero-phase magnetic fluxes $\Phi 0$ becomes 60° in terms of the rotation electrical angle and becomes 30° in terms of the mechanical angle.

REFERENCE SIGNS LIST 1 to 5 . . . Electrical motor system
10 . . . Battery
12 . . . Inverter
121 . . . First inverter
122 . . . Second inverter
14 . . . Electric motor
18 . . . Control unit
20U . . . U-phase winding
20V . . . V-phase winding
20W . . . W-phase winding
20U+ . . . U-phase forward winding
20U− . . . U-phase reverse winding
20V+ . . . V-phase forward winding
20V− . . . V-phase reverse winding
20W+ . . . W-phase forward winding
20W− . . . W-phase reverse winding
22$u$ . . . U-phase terminal
22$v$ . . . V-phase terminal
22$w$ . . . W-phase terminal
30 . . . Rotor
32 . . . Stator core
34 . . . Stator core body portion
36 . . . Concentrated winding stator coil
38 . . . Slot
40 . . . Rotor body portion
50 . . . Inverter control unit
52$u$, 52$v$, 52$w$, 72$u$, 72$v$, 72$w$ . . . Target signal generation unit
52$z$, 74 . . . Zero-phase signal generation unit
54 . . . Carrier signal generation unit
56$u$, 56$v$, 56$w$, 56$z$ . . . Comparison unit
58$u$, 58$v$, 58$w$, 58$z$ . . . Buffer
60 . . . Zero-phase control unit
70 . . . Second inverter control unit
76$u$, 76$v$, 76$w$ . . . Adder
U, V, W, U1, V1, W1, U2, V2, W2 . . . Switching arm
Z, Z1, Z2 . . . Zero-phase switching arm
S1 to S6, B1 to B6, A1, A2, A11, A12, A21, A22 . . . Switching element
T1 to T12 . . . Tooth
M1 to M4 . . . Permanent magnet
$\Phi r$ . . . Rotating flux
$\Phi 0$ . . . Zero-phase magnetic flux

What is claimed is:
1. An electric motor system comprising:
a stator core body portion enclosing a rotor;
a plurality of teeth arranged in a circular manner and respectively projecting toward the rotor from a wall surface of the stator core body portion;
a concentrated winding stator coil which includes plural-phase windings and in which the windings are arranged at teeth defined for the respective windings among a plurality of the teeth;
an inverter to which respective first ends of the plural-phase windings are connected and which applies a current for generating rotating fluxes around the rotor to the plural-phase windings; and
a zero-phase switching arm to which respective second ends of the plural-phase windings are commonly connected, and which adjusts a zero-phase current flowing through a common connection point of the plural-phase windings and generates torque at the rotor using the zero-phase current, wherein the zero-phase switching arm is configured to adjust the zero-phase current by switching control, to directions of zero-phase magnetic fluxes becoming opposite in response to a magnetic pole of the rotor rotating from a position of a first tooth to a position of a second tooth, which is adjacent to the first tooth.

2. The electric motor system according to claim 1, wherein:

the electric motor system comprises U-phase, V-phase and W-phase windings as the plural-phase windings;

the U-phase, V-phase and W-phase windings respectively comprise forward windings and reverse windings which are not directly connected;

the forward windings and the reverse windings of respective phases are arranged at teeth defined for the forward windings and the reverse windings of the respective phases among a plurality of the teeth; and the electric motor system comprises:
  a first inverter to which respective first ends of a U-phase forward winding, a V-phase reverse winding and a W-phase forward winding are connected, and which applies a current for generating rotating fluxes around the rotor, to the U-phase forward winding, the V-phase reverse winding and the W-phase forward winding;
  a first zero-phase switching arm to which respective second ends of the U-phase forward winding, the V-phase reverse winding and the W-phase forward winding are commonly connected, and which adjusts a zero-phase current flowing through a common connection point of the U-phase forward winding, the V-phase reverse winding, and the W-phase forward winding;
  a second inverter to which respective first ends of a U-phase reverse winding, a V-phase forward winding, and a W-phase reverse winding are connected, and which applies a current for generating rotating fluxes around the rotor, to the U-phase reverse winding, the V-phase forward winding, and the W-phase reverse winding; and
  a second zero-phase switching arm to which respective second ends of the U-phase reverse winding, the V-phase forward winding, and the W-phase reverse winding are commonly connected, and which adjusts a zero-phase current flowing through a common connection point of the U-phase reverse winding, the V-phase forward winding, and the W-phase reverse winding.

3. The electric motor system according to claim 1, wherein:

the plural-phase windings respectively comprise forward windings and reverse windings which are not directly connected; and the electric motor system comprises:
  a first inverter to which respective first ends of the forward windings are connected, and which applies a current for generating rotating fluxes around the rotor to the forward windings;
  a first zero-phase switching arm to which respective second ends of the forward windings are commonly connected, and which adjusts a zero-phase current flowing through a common connection point of the forward windings;
  a second inverter to which respective first ends of the reverse windings are connected, and which applies a current for generating rotating fluxes around the rotor to the reverse windings; and
  a second zero-phase switching arm to which respective second ends of the reverse windings are commonly connected, and which adjusts a zero-phase current flowing through a common connection point of the reverse windings.

* * * * *